(12) United States Patent
Gil et al.

(10) Patent No.: US 8,372,551 B2
(45) Date of Patent: Feb. 12, 2013

(54) HYDROGEN GENERATING APPARATUS AND FUEL CELL POWER GENERATION SYSTEM

(75) Inventors: Jae-Hyoung Gil, Seoul (KR); Jae-Hyuk Jang, Seongnam-si (KR); Hong-Ryul Lee, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 760 days.

(21) Appl. No.: 12/078,477

(22) Filed: Mar. 31, 2008

(65) Prior Publication Data

US 2008/0268307 A1 Oct. 30, 2008

(30) Foreign Application Priority Data

Apr. 25, 2007 (KR) .................. 10-2007-0040557

(51) Int. Cl.
*H01M 8/06* (2006.01)
*C25B 1/02* (2006.01)
(52) U.S. Cl. ......... 429/422; 429/416; 429/421; 205/639
(58) Field of Classification Search .................. 204/248, 204/267–270; 205/633, 637–639; 429/422; 48/61
See application file for complete search history.

(56) References Cited

U.S. PATENT DOCUMENTS

| | | | | |
|---|---|---|---|---|
| 4,098,258 A | * | 7/1978 | Kober | 126/263.01 |
| 5,843,292 A | * | 12/1998 | Spiros | 204/258 |
| 6,054,228 A | * | 4/2000 | Cisar et al. | 429/443 |
| 2004/0118677 A1 | * | 6/2004 | Streckert et al. | 204/237 |
| 2007/0039815 A1 | * | 2/2007 | Bartel | 204/242 |
| 2007/0138022 A1 | * | 6/2007 | Peter et al. | 205/628 |

FOREIGN PATENT DOCUMENTS

| | | |
|---|---|---|
| JP | 2005-133146 | 5/2005 |
| JP | 2006-249496 | 9/2006 |
| JP | 2006-313706 | 11/2006 |

OTHER PUBLICATIONS

Japanese Office Action issued Sep. 14, 2010 in corresponding Japanese Patent Application 2008-110414.

* cited by examiner

*Primary Examiner* — Basia Ridley
*Assistant Examiner* — James Lee (57) ABSTRACT

A hydrogen generating apparatus and a fuel cell power generation system are disclosed. The hydrogen generating apparatus may include an electrolyte bath, which contains an electrolyte solution; a first electrode, which is stacked on a surface inside the electrolyte bath, and which generates electrons; a moisture absorption layer, which is stacked on the first electrode, and which absorbs moisture from the electrolyte solution; and a second electrode, which is stacked on the moisture absorption layer, and which generates hydrogen using the electrons and the electrolyte solution. With this apparatus, the electrodes can be formed as thin films, whereby the number of electrodes can be increased and -the gaps between electrodes can be decreased, to increase the amount of hydrogen generation. Also, the flow of electrons can be controlled, using a control unit, in accordance to the amount of hydrogen or amount of electrical power required by the fuel cell.

18 Claims, 4 Drawing Sheets

HYDROGEN GENERATING APPARATUS AND FUEL CELL POWER GENERATION SYSTEM

CROSS-REFERENCE TO RELATED APPLICATIONS

This application claims the benefit of Korean Patent Application No. 10-2007-0040557 filed with the Korean Intellectual Property Office on Apr. 25, 2007, the disclosure of which is incorporated herein by reference in its entirety.

BACKGROUND

1. Technical Field

The present invention relates to a hydrogen generating apparatus and a fuel cell power generation system.

2. Description of the Related Art

A fuel cell is an apparatus that converts the chemical energies of fuel (hydrogen, LNG, LPG, methanol, etc.) and air directly into electricity and heat, by means of electrochemical reactions. In contrast to conventional power generation techniques, which employ the processes of burning fuel, generating vapor, driving turbines, and driving power generators, the utilization of fuel cells does not entail combustion processes or driving apparatus. As such, the fuel cell is the result of new technology for generating power that offers high efficiency and few environmental problems.

Figure 1:
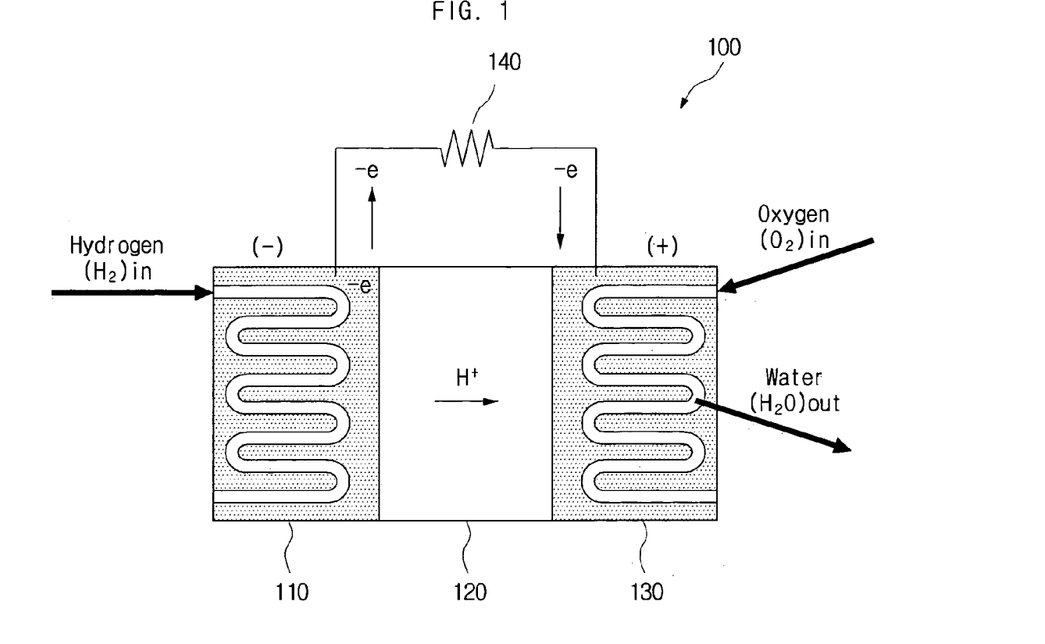
FIG. 1 is a diagram illustrating the operating principle of a fuel cell.

FIG. 1 is a diagram illustrating the operating principle of a fuel cell.

Referring to FIG. 1, a fuel cell 100 may include a fuel electrode 110 as an anode and an air electrode 130 as a cathode. The fuel electrode 110 receives molecular hydrogen ($H_2$), which is dissociated into hydrogen ions ($H^+$) and electrons ($e^-$). The hydrogen ions move past a moisture absorption layer 126 towards the air electrode 130. This moisture absorption layer 120 corresponds to an electrolyte layer. The electrons move through an external circuit 140 to generate an electric current. The hydrogen ions and the electrons combine with the oxygen in the air at the air electrode 130 to generate water. The following Reaction Scheme 1 represents the chemical reactions described above.

[Reaction Scheme 1]

Fuel electrode 110:

Air electrode 130:

Overall reaction:

In short, the fuel cell can function as a battery, as the electrons dissociated from the fuel electrode 110 generate a current that passes through the external circuit. Such a fuel cell 100 is a relatively pollution-free power source, because it does not produce any polluting emissions such as SOx, NOx, etc., and produces only little amounts of carbon dioxide. The fuel cell may also offer several other advantages, such as low noise and little vibration, etc.

In order for the fuel cell 100 to generate electrons at the fuel electrode 110, a hydrogen generating apparatus may be needed, which modifies a regular fuel containing hydrogen atoms into a gas having a high hydrogen content, as required by the fuel cell 100.

Examples of fuel cells being researched for application to portable electronic devices include the polymer electrolyte membrane fuel cell (PEMFC), which uses hydrogen as fuel, and the direct liquid fuel cell, such as the direct methanol fuel cell (DMFC), which uses liquid fuel directly. The PEMFC provides a high output density, but requires a separate apparatus for supplying hydrogen. Using a hydrogen storage tank, etc., for supplying the hydrogen can result in a large volume and can require special care in handling and keeping.

Figure 2:
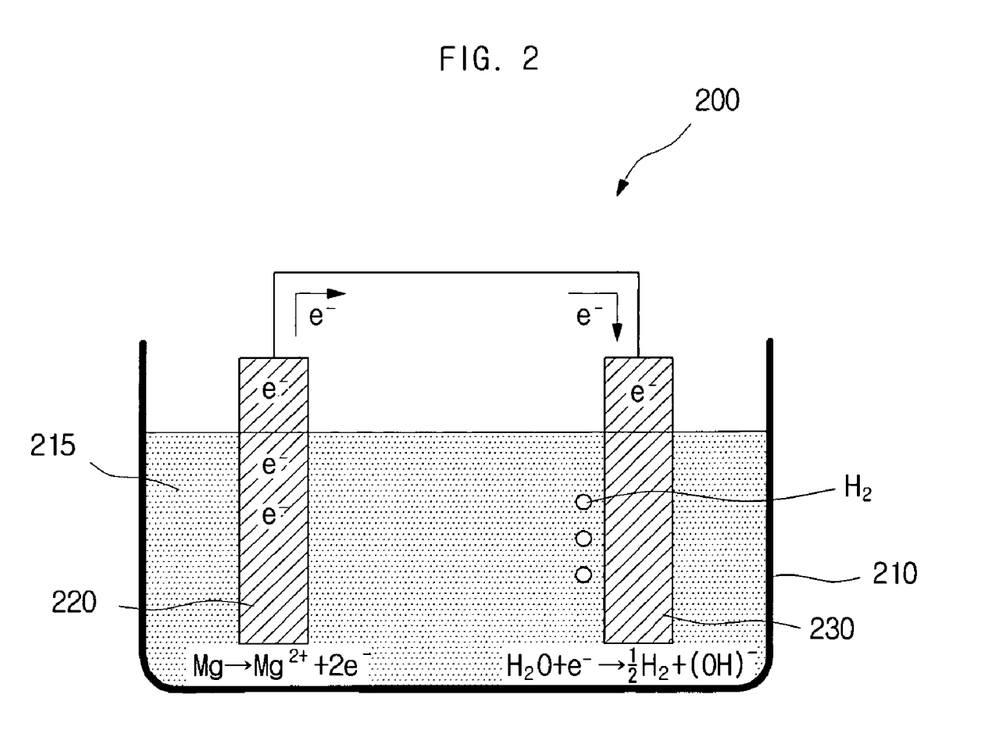
FIG. 2 is a cross-sectional view schematically illustrating a conventional hydrogen generating apparatus.
Figure 3:
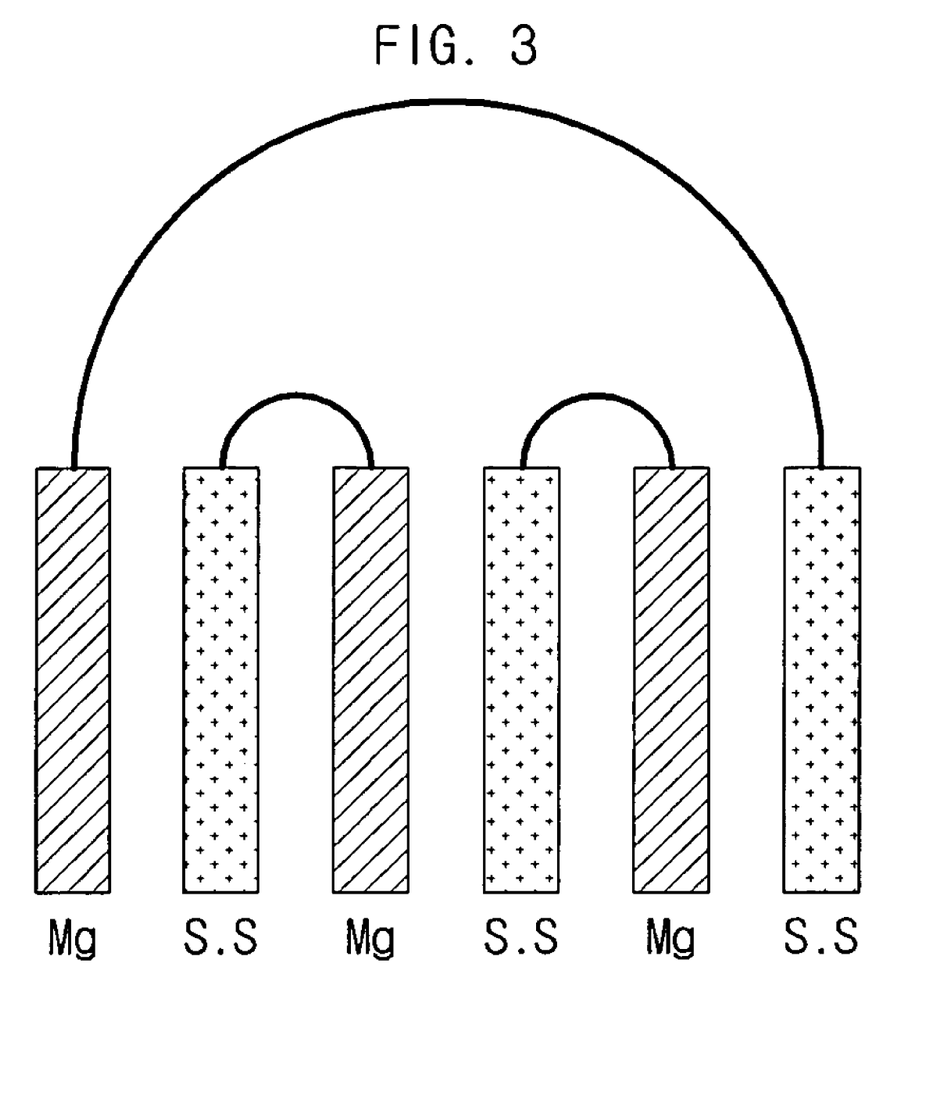
FIG. 3 is a diagram illustrating a mode of connecting electrodes in a conventional hydrogen generating apparatus.

FIG. 2 is a cross-sectional view schematically illustrating a conventional hydrogen generating apparatus, and FIG. 3 is a diagram illustrating a mode of connecting electrodes in a conventional hydrogen generating apparatus. As illustrated, an anode 220 made of magnesium and a cathode 230 made of stainless steel may be dipped in an aqueous electrolyte solution 215 inside an electrolyte bath 210.

The basic principle of the hydrogen generating apparatus 200 is that electrons are generated at the magnesium electrode 220, which has a greater tendency to ionize than the stainless steel electrode 230, and the generated electrons travel to the stainless steel 230 electrode. The electrons can then react with the aqueous electrolyte solution 215 to generate hydrogen.

Here, positioning the magnesium and stainless steel electrodes in alternation, as illustrated in FIG. 3, can increase the amount of hydrogen generated. However, in a hydrogen generating apparatus structured as such, an increase in the number of electrodes may lead to an increase in volume occupied by the electrodes, and thus may not be applicable in compact and low-thickness electronic devices.

In order for the fuel cell to suitably accommodate the demands in current portable electronic devices (e.g. cell phones, laptops, etc.) for high-capacity power supply apparatus, the fuel cell needs to have a small volume while providing high performance.

The fuel cell may employ a method of generating hydrogen after reforming fuel, such as methanol or formic acid, etc., approved by the ICAO (International Civil Aviation Organization) for boarding on airplanes, or may employ a method of using methanol, ethanol, or formic acid, etc., directly as the fuel.

However, the former case may require a high reforming temperature, a complicated system, and high driving power, and is likely to have impurities (e.g. $CO_2$, CO, etc.) included, besides pure hydrogen. On the other hand, the latter may entail the problem of very low power density, due to the low rate of a chemical reaction at the anode and the cross-over of hydrocarbons through the moisture absorption layer.

SUMMARY

An aspect of the invention is to provide a hydrogen generating apparatus and a fuel cell power generation system, which can generate pure hydrogen at room temperature using electrochemical reactions, and which have simple structures capable of controlling the amount of hydrogen generated without requiring separate BOP (Balance of Plant) equipment, and which are implemented to have thin film electrodes.

One aspect of the invention provides a hydrogen generating apparatus that includes: an electrolyte bath, which contains an electrolyte solution; a first electrode, which is stacked on a surface inside the electrolyte bath, and which generates electrons; a moisture absorption layer, which is stacked on the first electrode, and which absorbs moisture from the electrolyte solution; and a second electrode, which is stacked on the moisture absorption layer, and which generates hydrogen using the electrons and the electrolyte solution.

The first electrode, the moisture absorption layer, and the second electrode can be formed by at least one of an inkjet coating method, a spray coating method, and a thin film deposition method.

The thicknesses of the first electrode and the moisture absorption layer may be 10 to 100 μm, while the thickness of the second electrode may be 10 to 50 μm. The first electrode, the moisture absorption layer, and the second electrode can be thin film layers.

The hydrogen generating apparatus may further include a control unit, which may control the amount of electrons flowing from the first electrode to the second electrode. In addition, the hydrogen generating apparatus may also further include a first conductive electrode, which may be formed on one side of the first electrode, and which may electrically connect the first electrode with the control unit, and the hydrogen generating apparatus may likewise further include a second conductive electrode, which may be formed on one side of the second electrode, and which may electrically connect the second electrode with the control unit.

Stack compositions, each including the first electrode, the moisture absorption layer, and the second electrode, can be stacked together, with the moisture absorption layer interposed between the stack compositions, to form a multilayer structure.

The electrolyte bath can further include a hydrogen outlet that is configured to discharge the hydrogen, and the hydrogen generating apparatus can include a gas-liquid separation membrane, which may be interposed between the electrolyte bath and the hydrogen outlet, and which may permit discharge for hydrogen but prevent discharge for the electrolyte solution.

Another aspect of the invention provides a fuel cell power generation system that includes: a hydrogen generating apparatus, where the hydrogen generating apparatus includes an electrolyte bath containing an electrolyte solution, a first electrode stacked on a surface inside the electrolyte bath and configured to generate electrons, a moisture absorption layer stacked on the first electrode and configured to absorb moisture from the electrolyte solution, and a second electrode stacked on the moisture absorption layer and configured to generate hydrogen using the electrons and the electrolyte solution; and a fuel cell that receives the hydrogen generated by the hydrogen generating apparatus and converts the chemical energy of the hydrogen into electrical energy, to produce a direct electrical current.

The first electrode, the moisture absorption layer, and the second electrode can be formed by at least one of an inkjet coating method, a spray coating method, and a thin film deposition method.

The thicknesses of the first electrode and the moisture absorption layer may be 10 to 100 μm, while the thickness of the second electrode may be 10 to 50 μm. The first electrode, the moisture absorption layer, and the second electrode can be thin film layers.

A control unit may further be included, which may control the amount of electrons flowing from the first electrode to the second electrode. In addition, the fuel cell power generation system may also further include a first conductive electrode, which may be formed on one side of the first electrode, and which may electrically connect the first electrode with the control unit, and the fuel cell power generation system may likewise further include a second conductive electrode, which may be formed on one side of the second electrode, and which may electrically connect the second electrode with the control unit.

Stack compositions, each including the first electrode, the moisture absorption layer, and the second electrode, can be stacked together, with the moisture absorption layer interposed between the stack compositions, to form a multilayer structure.

The electrolyte bath can further include a hydrogen outlet that is configured to discharge the hydrogen, and the fuel cell power generation system can include a gas-liquid separation membrane, which may be interposed between the electrolyte bath and the hydrogen outlet, and which may permit discharge for hydrogen but prevent discharge for the electrolyte solution.

Additional aspects and advantages of the present invention will be set forth in part in the description which follows, and in part will be obvious from the description, or may be learned by practice of the invention.

DETAILED DESCRIPTION

As the invention allows for various changes and numerous embodiments, particular embodiments will be illustrated in drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

While such terms as "first" and "second," etc., may be used to describe various elements, such elements must not be limited to the above terms. The above terms are used only to distinguish one element from another. For example, a first element may be referred to as a second element without departing from the scope of rights of the present invention, and likewise a second element may be referred to as a first element. The term "and/or" encompasses both combinations of the plurality of related items disclosed and any one item from among the plurality of related items disclosed.

When an element is mentioned to be "connected to" or "accessing" another element, this may mean that it is directly formed on or stacked on the other element, but it is to be understood that another element may exist in-between. On the other hand, when an element is mentioned to be "directly connected to" or "directly accessing" another element, it is to be understood that there are no other elements in-between.

The terms used in the present application are merely used to describe particular embodiments, and are not intended to limit the present invention. An expression used in the singular encompasses the expression of the plural, unless it has a clearly different meaning in the context. In the present application, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Certain embodiments of the invention will now be described below in more detail with reference to the accompanying drawings.

Figure 4:
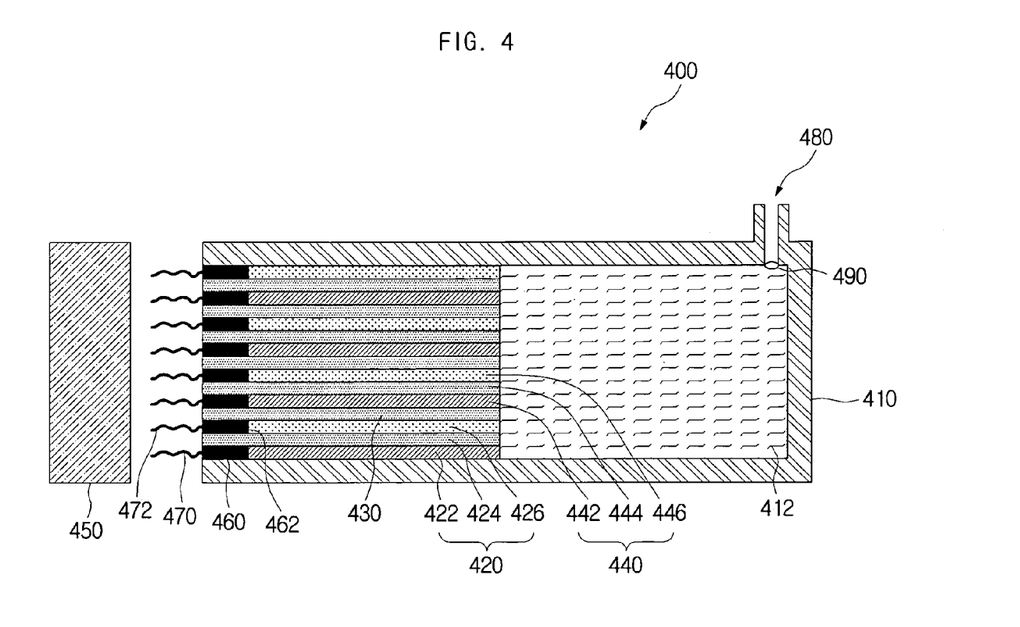
FIG. 4 is a cross-sectional view schematically illustrating a hydrogen generating apparatus according to an embodiment of the invention.

FIG. 4 is a cross-sectional view schematically illustrating a hydrogen generating apparatus according to an embodiment of the invention.

The hydrogen generating apparatus 400 may include an electrolyte bath 410, an electrolyte solution 412, a first stack composition 420, a second stack composition 440, first electrodes 422, 442, moisture absorption layers 424, 430, 444, second electrodes 426, 446, a control unit 450, conductive electrodes 460, 462, wires 470, 472, a hydrogen outlet 480, and a gas-liquid separation membrane 490. For better understanding and easier explanation, the following description will focus on an example configuration in which the first electrodes 422 are made of magnesium (Mg) and the second electrodes 426 are made of stainless steel.

The electrolyte bath 410 may contain an electrolyte solution 412 inside. The electrolyte solution 412 may contain hydrogen ions, which can be used by the hydrogen generating apparatus 400 to generate hydrogen gas.

A compound such as LiCl, KCl, NaCl, $KNO_3$, $NaNO_3$, $CaCl_2$, $MgCl_2$, $K_2SO_4$, $Na_2SO_4$, $MgSO_4$, AgCl, etc., can be used as the electrolyte in the electrolyte solution 412. The volume of the electrolyte solution 412 may be about twice the volume of the later-described stack compositions 420, 440 formed within the electrolyte bath 410. One reason for this may be to allow a sufficient supply of water during the chemical reaction for generating hydrogen.

Inside the electrolyte bath 410, a first stack composition 420 may be included, which may be composed of a first electrode 422, a moisture absorption layer 424, and a second electrode 426. Also within the electrolyte bath 410, a second stack composition 440 may further be stacked over the first stack composition 420, with another moisture absorption layer 430 interposed in-between, where the additionally stacked second stack composition 440 may be composed of a first electrode 442, moisture absorption layer 444, and second electrode 446.

The stack compositions 420, 440 can be stacked in a structure of multiple layers to increase the amount of hydrogen that can be generated. As the electrodes 422, 426, 442, 446 and moisture absorption layers 424, 430, 444 may be stacked in the form of thin films, an ultra-small hydrogen generating apparatus can be implemented with small distances between electrodes and a low overall thickness.

The first electrode 422 may be an active electrode, where the magnesium (Mg) is oxidized into a magnesium ion ($Mg^{2+}$) releasing two electrons, due to the difference in ionization energy between magnesium and water ($H_2O$). The electrons thus generated may travel through a wire 470 to the control unit 450, and then through a wire 472 connected with the control unit 450 to the second electrode 426. As such, the first electrode 422 may be expended in accordance with the electrons generated, and may have to be replaced after a certain period of time. Also, the first electrode 422 may be made of a metal having a greater tendency to ionize than the material used for the later-described second electrode 426.

The first electrodes 422, 442, second electrodes 426, 446, and moisture absorption layers 424, 430, 444 can be formed by at least one of an inkjet coating method, a spray coating method, and a thin film deposition method. For this particular embodiment, the descriptions will illustrate an example in which an inkjet coating method is used.

The first electrode 422 can be implemented by printing magnesium ink onto a ceramic substrate or a polymer substrate, to form a thin film. The thickness of the thin films for the first electrodes 422, 442 can be 10 to 100 μm. If the thickness of a thin film for the first electrode 422, 442 is less than 10 μm, the thin film may face difficulties in functioning as an electrode, whereas if the thickness is greater than 100 μm, the electrode may not be implemented as a thin film.

A moisture absorption layer 424 may be positioned over the first electrode 422 or between the first stack composition 420 and the second stack composition 440. The moisture absorption layer 424 may have the form of a membrane, and may be made of a porous material. By forming the moisture absorption layers 424, 430, 444 as membranes or as porous materials, the moisture absorption layers 424, 430, 444 can be made to absorb moisture from the water-like electrolyte solution 412, whereby the movement of $Mg^{2+}$ ions can be facilitated.

Similar to the first electrodes 422, the moisture absorption layers 424, 430, 444 can be printed by an inkjet coating method to implement thin-film moisture absorption layers 424, 430, 444, where the printing can be performed to a thickness of 10 to 100 μm. If the thickness of a moisture absorption layer 424, 430, 444 is less than 10 μm, the moisture absorption layer 424, 430, 444 may not readily absorb the moisture of the electrolyte solution 412, so that the movement of the $Mg^{2+}$ ions may not be facilitated, whereas if the thickness is greater than 100 μm, the moisture absorption layer 424, 430, 444 may not be implemented as a thin film.

The second electrode 426 may be an inactive electrode. The second electrode 426 may be printed as a thin film by an inkjet printing method onto the moisture absorption layer 424, and may receive the electrons that have traveled from the magnesium of the first metal electrode 422, to react with the electrolyte solution 412 and generate hydrogen.

The thickness of the second electrode 426 can be 10 to 50 μm, because if the thickness is less than 10 μm, the second electrode 426 may not readily receive the electrons, whereas if the thickness is greater than 50 μm, the electrode may not be implemented as a thin film. As the second electrode 426 may be an inactive electrode and may not be expended, unlike the first electrode 422, the second electrode 426 can be formed to a lower thickness than that of the first electrode 422.

Looking at the chemical reaction at the second electrode 426, water may be dissociated at the second electrode 426 after receiving the electrons from the first electrode 422, whereby hydrogen may be generated.

The reaction above can be represented by the following Reaction Scheme 2.

[Reaction Scheme 2]

First electrode:

$$Mg \longrightarrow Mg^{2+} + 2e^-$$

Second electrode:

Overall reaction:

In the above electrochemical reaction, the rate of hydrogen generation may be increased by decreasing the gaps between electrodes, and/or by increasing the number of electrodes used. To take advantage of this principle, the electrodes and moisture absorption layers can be implemented in the form of thin films, as described above.

Therefore, to increase the number of thin-film electrodes, a moisture absorption layer 430 may be formed, which may be stacked on the second electrode 426 and which may absorb the moisture of the electrolyte solution 412. The moisture absorption layer 430 stacked over the second electrode 426 can be of the same type as the moisture absorption layer 424 printed over the first electrode 422, and can provide substantially the same effect. As such, the moisture absorption layer 430 may be formed as a membrane or as a porous material, so that the moisture absorption layer 430 may absorb moisture from the water-like electrolyte solution 412 and facilitate the movement of $Mg^{2+}$ ions.

In order to increase the number of thin-film electrodes, the thin film of the first electrode 442 may be stacked over the moisture absorption layer 430 by an inkjet coating method. The first electrode 442 can be a magnesium electrode, and can be substantially the same as the first electrode 422 of the first stack composition 420 both in type and effect provided.

Therefore, a chemical reaction can be implemented, by way of the moisture absorption layer 430, between the first electrode 442 of the second stack composition 440 and the second electrode 426 of the first stack composition 420. To be more specific, the electrons generated at the magnesium of the first electrode 442 may travel through the wire to the control unit 450, and then may travel through another wire to the second electrode 426.

At the second electrode 426, the electrons that have traveled from the first electrode 422 of the first stack composition 420 and the first electrode 442 of the second stack composition 440 can react with the electrolyte solution 412, whereby hydrogen may be generated.

As described above, by forming the electrodes continuously with the moisture absorption layers 430 positioned in-between, the amount of hydrogen generated can further be increased. In addition, to increase the amount of hydrogen even more, a moisture absorption layer 444 can be stacked over the first electrode 442 and a second electrode 446 can be stacked repeatedly.

The magnesium electrodes 422, 442, the moisture absorption layers 424, 430, 444, and the stainless steel electrodes 426, 446 can be stacked repeatedly in alternation to increase the rate of hydrogen generation, and the electrodes can be implemented in the form of thin films by an inkjet coating method, so that the number of electrodes can be increased and the gaps between electrodes can be decreased, making it possible to provide the hydrogen generating apparatus 400 in a compact size.

The number of electrodes can be twenty to thirty layers, and under the right conditions, a hundred or more layers may be stacked. The composition of multiply stacked electrodes can be implemented in an integrated form using a hot pressing method or curing method, etc. As a result, a miniature-sized hydrogen generating apparatus 400 may be implemented, the total thickness of which may be 2 to 3 mm.

The rate and efficiency of the chemical reactions described above are determined by a number of factors. Examples of factors that determine the reaction rate include the area of the first electrodes 422 and/or the second electrodes 426, the concentration of the electrolyte solution 412, the type of the electrolyte solution 412, the number of first electrodes 422 and/or second electrodes 426, the method of connection between the first electrodes 422 and the second electrodes 426, and the electrical resistance between the first electrodes 422 and the second electrode 426, etc.

Changes in the factors described above can alter the amount of electric current (i.e. the amount of electrons) flowing between the first electrodes 422 and second electrode 426, whereby the rate of the electrochemical reaction represented in Reaction Scheme 2 may be changed. A change in the rate of the electrochemical reaction will result in a change in the amount of hydrogen generated at the second electrodes 426.

Thus, in embodiments of the invention, it is possible to adjust the amount of hydrogen generated by adjusting the amount of electric current flowing between the first electrodes 422 and the second electrodes 426. The underlying principle of this can be explained by the following Equation 1 using Faraday's law.

$$N_{hydrogen} = \frac{i}{nE} \quad \text{[Equation 1]}$$

$$N_{hydrogen} = \frac{i}{2 \times 96485} \text{ (mol)}$$

$$V_{hydrogen} = \frac{i}{2 \times 96485} \times 60 \times 22400 \text{ (ml/min)}$$

$$= 7 \times i \text{ (ml/min)}$$

Here, $N_{hydrogen}$ represents the amount of hydrogen generated per second (mol/sec), and $V_{hydrogen}$ represents the volume of hydrogen generated per minute (ml/min). i represents current (C/s), n represents the number of reacting electrons (mol), and E represents the charge per one mole of electrons (C/mol).

With reference to Reaction Scheme 2 described above, as two electrons react at the second electrode 426, n equals 2, and the charge per one mole of electrons is about −96,485 coulombs.

The volume of hydrogen generated in one minute can be calculated by multiplying the amount of hydrogen generated in one second by the time (60 seconds) and the volume of one mole of hydrogen (22,400 ml).

If the fuel cell is used in a 2 W system, the required amount of hydrogen may be about 42 ml/mol, and 6 A of electric current may be needed. If the fuel cell is used in a 5 W system, the required amount of hydrogen may be about 105 ml/mol, and 15 A of electric current may be needed.

In this way, by adjusting the amount of electric current flowing in the wires 470 connected to the first electrodes 422 and the wires 472 connected to the second electrodes 426, the hydrogen generating apparatus 400 can be made to generate the amount of hydrogen required by the connected fuel cell.

Among the factors listed above that determine the reaction rate for generating hydrogen at the second electrodes 426 of the hydrogen generating apparatus 400, those factors other than the electrical resistances between the first electrodes 422 and the second electrodes 426 are determined when constructing the hydrogen generating apparatus 400, and thus are not easy to change.

Thus, in this particular embodiment of the invention, the hydrogen generating apparatus 400 may include a control unit 450 between the first electrodes 422 and the second electrodes 426, to control the amount of electrons traveling from the first electrode 422 of the first stack composition 420 and the first electrode 442 of the second stack composition 440 to the second electrodes 426 by adjusting the electrical resistance.

In other words, by changing the electrical resistance between the first electrodes 422 and the second electrodes 426 based on the above Equation 1, the magnitude of the electric current between the first electrodes 422 and the second electrodes 426 can be adjusted, making it possible to generate hydrogen by an amount required by the fuel cell.

In certain embodiments of the invention, the first electrode 422 can be made of a metal other than magnesium that has a relatively high ionization tendency, such as iron (Fe) or an alkali metal such as aluminum (Al), zinc (Zn), etc. The second electrode 426 can be made of a metal such as platinum (Pt), copper (Cu), gold (Au), silver (Ag), iron (Fe), etc., that has a relatively lower ionization tendency than that of the metal used for the first electrode 422.

The control unit 450 may adjust the rate by which the electrons generated at the first electrodes 422 by the electrochemical reactions are transferred to the second electrodes 426, that is, the control unit 450 may adjust the electric current.

The control unit 450 may be inputted with the amount of power or amount of hydrogen required by the fuel cell, and if the required value is high, may increase the amount of electrons flowing from the first electrodes 422 to the second electrodes 426, or if the required value is low, may decrease the amount of electrons flowing from the first electrodes 422 to the second electrodes 426.

For example, the control unit 450 may include a variable resistance, to adjust the electric current flowing between the first electrodes 422 and second electrode 426 by varying the resistance value, or may include an on/off switch, to adjust the electric current flowing between the first electrodes 422 and second electrodes 426 by controlling the on/off timing.

Here, on one side of a first electrode 422, a conductive electrode 460 may be formed that electrically connects the first electrode 422 with the control unit 450. Also, a conductive electrode 462 may be formed on one side of a second electrode 426 to electrically connect the second electrode 426 with the control unit 450.

The conductive electrode 460 may be joined by the wire 470 to the control unit 450, and likewise the conductive electrode 462 formed on one side of the second electrode 426 may be joined by the wire 472 to the control unit 450. The wires 470, 472 can be formed by wire bonding. The conductive electrodes 460, 462 can be made of a metallic material, such as gold, for example. Similar to the electrodes 422, 426, 442, 446 and the moisture absorption layers 424, 430, 444, the conductive electrodes 460, 462 may also be printed by an inkjet coating method, to be given the form of thin films. The conductive electrodes 460, 462 may be printed at one side of the first electrodes 422 and second electrodes 426, respectively, and may be connected with wires.

Due to the additionally printed conductive material at one side of each of the first electrodes 422 and second electrodes 426, the electrons generated at the first electrodes 422 may readily move through the wires 470 to the control unit 450, and may readily move through other wires 472 to the second electrodes 426.

It is to be appreciated that the control unit 450 of this embodiment can be implemented as a circuit in a printed circuit board. By having the conductive electrodes 460, 462 and the first and second electrodes 422, 426, 442, 446 be in direct contact, the movement of electrons generated at the magnesium electrodes 422 to the stainless steel electrodes 426 can be facilitated.

The amount of electrical power or amount of hydrogen required by a fuel cell can be inputted to the hydrogen generating apparatus 400. For this, the hydrogen generating apparatus 400 may be joined to the fuel cell to receive the input directly from the fuel cell, or the hydrogen generating apparatus 400 may be equipped with a separate input device to receive input from the user on the amount of electrical power or amount of hydrogen required. The hydrogen generating apparatus 400 may control the flow of electrons in accordance with the amount of hydrogen or amount of electrical power required by the fuel cell.

In embodiments of the invention, there may be one first electrode 422 and/or one second electrode 426, or there may be two or more first and second electrodes 422, 426. If the numbers of first electrodes 422 and/or second electrodes 426 are increased, the amount of hydrogen generation may be increased for the same duration of time, making it possible to generate a desired amount of hydrogen in a shorter time period.

The hydrogen generated by multiple electrodes of a thin film structure as described above can be made to pass through a gas-liquid separation membrane 490 positioned between the electrolyte bath 410 and the hydrogen outlet 480 through which the hydrogen is discharged. The gas-liquid separation membrane 490 may permit the discharge of hydrogen while preventing the discharge of the electrolyte solution 412. In this way, the hydrogen that has passed through the gas-liquid separation membrane 490 may move through the hydrogen outlet 480 towards the fuel electrode of the fuel cell. The gas-liquid separation membrane 490 can also be made of the same type of porous material as that used for the moisture absorption layers 424, 430, 444.

It is to be appreciated that aspects of the invention also provide a fuel cell power generation system that includes the fuel cell which is supplied with the hydrogen generated in the hydrogen generating apparatus described above, and which converts the chemical energy of the hydrogen to electrical energy to produce a direct electrical current.

When the hydrogen generating apparatus provided in this embodiment is applied to a fuel cell, the apparatus for generating hydrogen can be implemented in a minute size, making it possible to provide a compact fuel cell. Furthermore, the gaps between electrodes may be reduced, and the number of electrodes may be increased, to enable a high efficiency in utilizing the electrodes.

As set forth above, in a hydrogen generating apparatus according to certain embodiments of the invention, the electrodes can be implemented in the form of thin films, so that the gaps between electrodes may be reduced, and the number of electrodes may be increased. This can increase the efficiency of the electrodes and can provide a compact volume.

Also, hydrogen may be generated using environment-friendly materials, instead of using separate BOP units, which consume electrical power and are difficult to provide in small sizes.

In addition, pure hydrogen can be generated at room temperature using electrochemical reactions, and the system can be implemented in a simple structure, while costs can be reduced.

Furthermore, in contrast to conventional apparatus, in which the hydrogen is generated to a certain fixed amount, certain embodiments of the invention make it possible to adjust the amount of hydrogen generation according to the requirements of the user or the fuel cell, by adjusting the electric current between electrodes. As such, the fuel cell can be employed in products such as mobile equipment, etc., in which the amount of power consumption changes frequently.

While the spirit of the invention has been described in detail with reference to particular embodiments, the embodiments are for illustrative purposes only and do not limit the invention. It is to be appreciated that those skilled in the art can change or modify the embodiments without departing from the scope and spirit of the invention.

What is claimed is:

1. A hydrogen generating apparatus comprising:
    an electrolyte bath containing an electrolyte solution;
    a first electrode, stacked on a surface inside the electrolyte bath and configured to generate electrons, oxidized in the electrolyte solution so as to release the electrons;
    a first moisture absorption layer, made of a porous material and being in direct contact with the first electrode, stacked on the first electrode and configured to absorb moisture from the electrolyte solution; and
    a second electrode having a thickness of 10 to 50 µm, in direct contact with the first moisture absorption layer, stacked on the first moisture absorption layer and configured to generate hydrogen using the electrons and the electrolyte solution, the second electrode receiving the electrons which travel from the first electrode so as to react with the electrolyte solution and generate the hydrogen,
    the first electrode being made of a metal having a greater tendency to ionize than material used for the second electrode,
    the first electrode, the first moisture absorption layer, and the second electrode being thin film layers, and
    the first electrode and the first moisture absorption layer having thicknesses of 10 to 100 µm, respectively.

2. The hydrogen generating apparatus of claim 1, wherein the first electrode, the first moisture absorption layer, and the second electrode are formed by at least one of an inkjet coating method, a spray coating method, and a thin film deposition method.

3. The hydrogen generating apparatus of claim 1, further comprising:
    a control unit configured to control an amount of electrons flowing from the first electrode to the second electrode.

4. The hydrogen generating apparatus of claim 3, further comprising:
    a first conductive electrode formed on one side of the first electrode and electrically connecting the first electrode with the control unit.

5. The hydrogen generating apparatus of claim 3, further comprising:
    a second conductive electrode formed on one side of the second electrode and electrically connecting the second electrode with the control unit.

6. The hydrogen generating apparatus of claim 1, wherein a stack composition is stacked in a multilayer structure, the stack composition comprising the first electrode, the first moisture absorption layer, and the second electrode.

7. The hydrogen generating apparatus of claim 6, further comprising a second moisture absorption layer interposed between the stack compositions.

8. The hydrogen generating apparatus of claim 1, wherein the electrolyte bath further comprises a hydrogen outlet configured to discharge the hydrogen.

9. The hydrogen generating apparatus of claim 8, further comprising:
    a gas-liquid separation membrane installed to the hydrogen outlet and configured to permit discharge for the hydrogen and prevent discharge for the electrolyte solution.

10. A fuel cell power generation system comprising:
    a hydrogen generating apparatus, the hydrogen generating apparatus comprising:
    an electrolyte bath containing an electrolyte solution,
    a first electrode, stacked on a surface inside the electrolyte bath and configured to generate electrons, oxidized in the electrolyte solution so as to release the electrons,
    a first moisture absorption layer, made of a porous material and being in direct contact with the first electrode, stacked on the first electrode and configured to absorb moisture from the electrolyte solution, and
    a second electrode having a thickness of 10 to 50 µm, in direct contact with the first moisture absorption layer, stacked on the first moisture absorption layer and configured to generate hydrogen using the electrons and the electrolyte solution, the second electrode receiving the electrons which travel from the first electrode so as to react with the electrolyte solution and generate the hydrogen, the first electrode being made of a metal having a greater tendency to ionize than material used for the second electrode; and
    a fuel cell configured to produce a direct electrical current by receiving the hydrogen generated by the hydrogen generating apparatus and converting chemical energy of the hydrogen into electrical energy,
    the first electrode, the first moisture absorption layer, and the second electrode being thin film layers, and
    the first electrode and the first moisture absorption layer having thicknesses of 10 to 100 µm, respectively.

11. The fuel cell power generation system of claim 10, wherein the first electrode, the first moisture absorption layer, and the second electrode are formed by at least one of an inkjet coating method, a spray coating method, and a thin film deposition method.

12. The fuel cell power generation system of claim 10, further comprising:
    a control unit configured to control an amount of electrons flowing from the first electrode to the second electrode.

13. The fuel cell power generation system of claim 12, further comprising:
    a first conductive electrode formed on one side of the first electrode and electrically connecting the first electrode with the control unit.

14. The fuel cell power generation system of claim 12, further comprising:
    a second conductive electrode formed on one side of the second electrode and electrically connecting the second electrode with the control unit.

15. The fuel cell power generation system of claim 10, wherein a stack composition is stacked in a multilayer structure, the stack composition comprising the first electrode, the first moisture absorption layer, and the second electrode.

16. The fuel cell power generation system of claim 15, further comprising a second moisture absorption layer interposed between the stack compositions.

17. The fuel cell power generation system of claim 10, wherein the electrolyte bath further comprises a hydrogen outlet configured to discharge the hydrogen.

18. The fuel cell power generation system of claim 17, further comprising:
    a gas-liquid separation membrane installed to the hydrogen outlet and configured to permit discharge for the hydrogen and prevent discharge for the electrolyte solution.

* * * * *

UNITED STATES PATENT AND TRADEMARK OFFICE
CERTIFICATE OF CORRECTION

PATENT NO. : 8,372,551 B2  
APPLICATION NO. : 12/078477  
DATED : February 12, 2013  
INVENTOR(S) : Jae-Hyoung Gil et al.

Page 1 of 1

It is certified that error appears in the above-identified patent and that said Letters Patent is hereby corrected as shown below:

On the Title Page, Item [57], Line 12; Delete "-the" and insert -- the --, therefor.

Signed and Sealed this
Second Day of July, 2013

Teresa Stanek Rea
*Acting Director of the United States Patent and Trademark Office*